US007011798B2

(12) United States Patent
Yano et al.

(10) Patent No.: US 7,011,798 B2
(45) Date of Patent: Mar. 14, 2006

(54) PROCESS FOR REPROCESSING SPENT NUCLEAR FUELS BY UTILIZING PHENOMENON OF COCRYSTALLIZATION

(75) Inventors: Kimihiko Yano, Naka-gun (JP); Atsuhiro Shibata, Naka-gun (JP); Kazunori Nomura, Naka-gun (JP); Hiroyasu Hirano, Naka-gun (JP); Atsushi Aoshima, Naka-gun (JP)

(73) Assignee: Japan Nuclear Cycle Development Institute, Ibaraki-ken (JP)

( * ) Notice: Subject to any disclaimer, the term of this patent is extended or adjusted under 35 U.S.C. 154(b) by 692 days.

(21) Appl. No.: 10/262,863

(22) Filed: Oct. 3, 2002

(65) Prior Publication Data

US 2003/0133860 A1 Jul. 17, 2003

(30) Foreign Application Priority Data

Jan. 17, 2002 (JP) ............................ 2002-008320

(51) Int. Cl.
*C01G 43/00* (2006.01)

(52) U.S. Cl. ........................ 423/18; 423/250; 423/251; 423/253

(58) Field of Classification Search .................. 423/18, 423/11, 12, 250, 251, 253; 976/DIG. 279
See application file for complete search history.

(56) References Cited

U.S. PATENT DOCUMENTS 4,759,878 A 7/1988 Henrich et al.
5,112,581 A * 5/1992 Ohuchi et al. ................. 423/3
6,033,636 A 3/2000 Todokoro et al.

FOREIGN PATENT DOCUMENTS

GB 863571 3/1961

* cited by examiner

*Primary Examiner*—Steven Bos
(74) *Attorney, Agent, or Firm*—Wenderoth, Lind & Ponack, L.L.P.

(57) ABSTRACT

A reprocessing process of spent nuclear fuels for roughly separating U and U—Pu from FP, TRU and the like in a nitric acid solution of spent nuclear fuels by utilizing phenomenon of cocrystallization of hexavalent U and Pu. For example, spent nuclear fuels are sheared and dissolved in nitric acid, and insoluble residues in the nitric acid solution are removed. Then, a nitric acid concentration in the solution is adjusted and a valence of Pu in the solution is adjusted to tetravalence. The solution is then cooled to crystallize uranyl nitrate hydrate crystals and separated into the crystals and a mother liquor, and the separated crystals are recovered as a U product. Then, a nitric acid concentration in the separated mother liquor is adjusted and a valance of U and Pu in the mother liquor is adjusted to hexavalence, and the mother liquor is cooled to crystallize uranyl-plutonyl nitrate hydrate crystals which are separated and recovered as a U—Pu mixed product.

2 Claims, 2 Drawing Sheets

PROCESS FOR REPROCESSING SPENT NUCLEAR FUELS BY UTILIZING PHENOMENON OF COCRYSTALLIZATION

BACKGROUND OF THE INVENTION

The present invention relates to a process for recovering nuclear fuel materials such as uranium (U) and plutonium (Pu) from spent nuclear fuels by utilizing phenomenon of cocrystallization of U and Pu.

Spent nuclear fuels contain materials that can be used again as nuclear fuels such as U, Pu and the like. Accordingly, energy resource can be utilized effectively by recovering and reusing these materials.

A process for reprocessing spent nuclear fuels put to practical use at present includes a Purex process. In this process, fuel assemblies are sheared at first and dissolved into nitric acid. Then, the resulting nitric acid solution is clarified, a nitric acid concentration and the like are adjusted, and U and Pu are extracted using tributyl phosphate (TBP) as an extraction solvent. Further, valence adjustment and the like are conducted by using reagents, and U and Pu are back-extracted, respectively, into an aqueous phase to selectively separate and recover U and Pu from fission products (FP), transuranium elements (TRU), corrosion products (CP) and the like.

The Purex process described above is an excellent process for reprocessing spent nuclear fuels in view of selective recovery of U and Pu, criticality control, safety, handling, etc. However, in view of reduction of the burden on the environment, it has been demanded to simplify the process steps and decrease the amount of liquid wastes generated. Further, use of an organic solvent under the presence of nitric acid may possibly form an explosive organic compound which is called "Red Oil" and therefore additional operation and control are required. Furthermore, since there is a process step in which Pu is present separately, it may be somewhat disadvantageous in view of nuclear non-proliferation.

SUMMARY OF THE INVENTION

An object of the present invention is to provide a process for reprocessing spent nuclear fuels capable of reducing the amount of liquid wastes to be generated, not forming "Red Oil" and capable of strengthening resistance to nuclear proliferation.

An outline of the present invention is a process of roughly separating U and U—Pu from FP, TRU and the like in a nitric acid solution of spent nuclear fuels by utilizing phenomenon of cocrystallization of hexavalent U and Pu.

According to the present invention, there is provided a process for reprocessing spent nuclear fuels by utilizing phenomenon of cocrystallization comprising;

a step of shearing spent nuclear fuels, dissolving sheared spent nuclear fuels into nitric acid to prepare a first nitric acid solution and removing insoluble residues in the first solution, a step of adjusting a nitric acid concentration of the first solution and adjusting a valence of U and Pu in the first solution into hexavalence, cooling the first solution to crystallize uranyl-plutonyl nitrate hydrate ((U,Pu)NH) crystals and separating the first solution into a first mother liquor and the (U,Pu)NH crystals, and a step of dissolving the separated (U,Pu)NH crystals again into nitric acid to prepare a second nitric acid solution, adjusting a valence of Pu in the second solution into tetravalence, cooling the second solution to crystallize uranyl nitrate hydrate (UNH) crystals, separating the second solution into a second mother liquor and the UNH crystals, recovering the separated UNH crystals as a U product and recovering the separated second mother liquor as a U—Pu mixed product.

Further, the present invention provides a process for reprocessing spent nuclear fuels by utilizing phenomenon of cocrystallization comprising;

a step of shearing spent nuclear fuels, dissolving sheared spent nuclear fuels into nitric acid to prepare a first nitric acid solution and removing insoluble residues in the first solution, a step of adjusting a nitric acid concentration of the first solution and adjusting a valence of Pu in the first solution into tetravalence, cooling the first solution to crystallize UNH crystals, separating the first solution into a first mother liquor and the UNH crystals and recovering the separated UNH crystals as a U product, and a step of adjusting a nitric acid concentration of the separated first mother liquor and adjusting a valence of U and Pu in the first mother liquor into hexavalence, cooling the first mother liquor to crystallize (U,Pu)NH crystals, separating the first mother liqor into a second mother liquor and the (U,Pu)NH crystals and recovering the separated (U,Pu)NH crystals as a U—Pu mixed product.

PREFERRED EMBODIMENTS OF THE INVENTION

Figure 1:
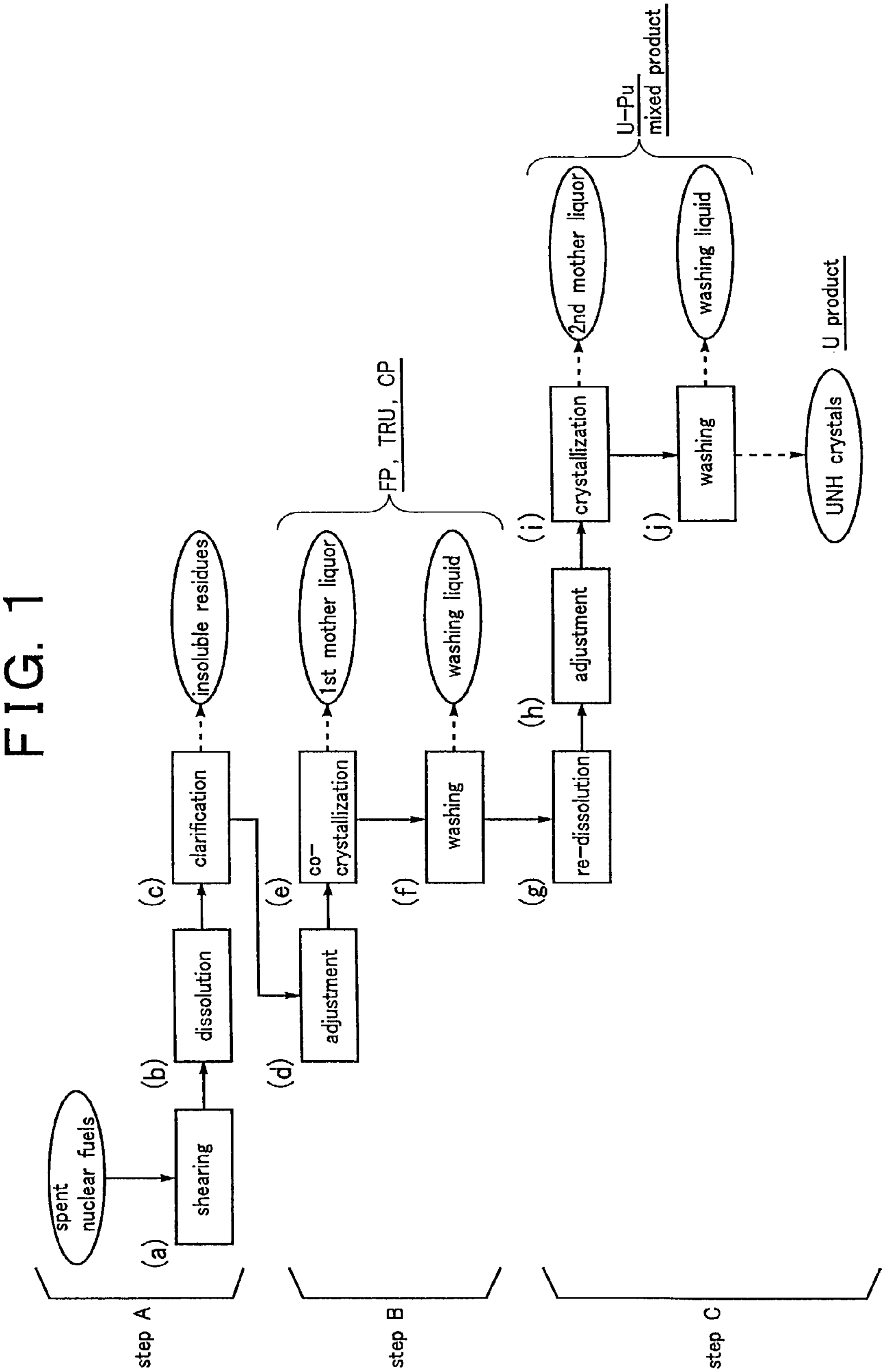
FIG. 1 is a flow chart showing an example of a process for reprocessing spent nuclear fuels according to this invention.

FIG. 1 is a flow chart showing an example of a process for reprocessing spent nuclear fuels by utilizing phenomenon of cocrystallization according to this invention.

At first, in the step A, spent nuclear fuels are sheared and dissolved into nitric acid to prepare a first nitric acid solution, and insoluble residues in the first solution are removed. Referring more specifically:

(a) The spent nuclear fuels (bundle of fuel pins) are sheared into small pieces by a shearing machine.

(b) Sheared pieces are dissolved in nitric acid to prepare the first nitric acid solution. For this purpose, boiling nitric acid at a concentration of 13 N or lower at about 110° C. is used, for instance.

(c) Then, the first solution after clarification is transferred to the next step. Thus, insoluble residues in the first solution are removed.

In the next step B, a nitric acid concentration of the first solution is adjusted and a valence of U and Pu in the first solution is adjusted to hexavalence. The first solution is then cooled to crystallize (U,Pu)NH crystals and separated into the resulting (U,Pu)NH crystals and a first mother liquor, and the separated crystals are washed. Thus, FP, TRU, CP and the like contained in the first mother liquor are separated and removed. Referring more specifically:

(d) The nitric acid concentration of the first solution is adjusted to about 6 M and the valence of U and Pu in the first solution is adjusted from tetravalence to hexavalence by, for instance, electrolysis.

(e) By cooling the first solution, UNH and (U, Pu)NH crystals are crystallized, and the first solution is separated into these crystals and the first mother liquor.

(f) The separated crystals are washed with nitric acid at a nitric acid concentration substantially identical with that of the first mother liquor.

Further, in the step C, the separated and washed crystals are dissolved again into nitric acid to prepare a second nitric acid solution and a valence of Pu in the second solution is adjusted to tetravalence. The second solution is then cooled to crystallize UNH crystals and separated into the resulting crystals and a second mother liquor. The separated crystals are washed and recovered as a U product while the second mother liquor is recovered as a U—Pu mixed product. Referring more specifically:

(g) The UNH crystals and (U,Pu) NH crystals obtained in the step B are re-dissolved into nitric acid to prepare the second nitric acid solution. These crystals are easily soluble in water and diluted nitric acid and are dissolved in nitric acid at a concentration of about 4 M at a temperature of about 40° C.

(h) The valence of Pu in the second solution is adjusted to tetravalence. This valence adjustment is conducted by, for instance, blowing a NOx gas into the second solution. Further, the nitric acid concentration in the second solution is adjusted so as not to form water ($H_2O$) and crystals of nitric acid tri-hydrate ($HNO_3.3H_2O$) by cooling in the crystallization step (i). The nitric acid concentration is adjusted to about 6 M.

(i) By cooling the second solution from about 40° C. to about 10° C., the UNH crystals are crystallized, and the UNH crystals are separated from the second solution to form the second mother liquor.

(j) The separated UNH crystals are washed with nitric acid at a nitric acid concentration substantially identical with that of the second mother liquid, and the washed UNH crystals are recovered as the U product, and the second mother liquor and the washing liquid are recovered as the U—Pu mixed product.

Figure 2:
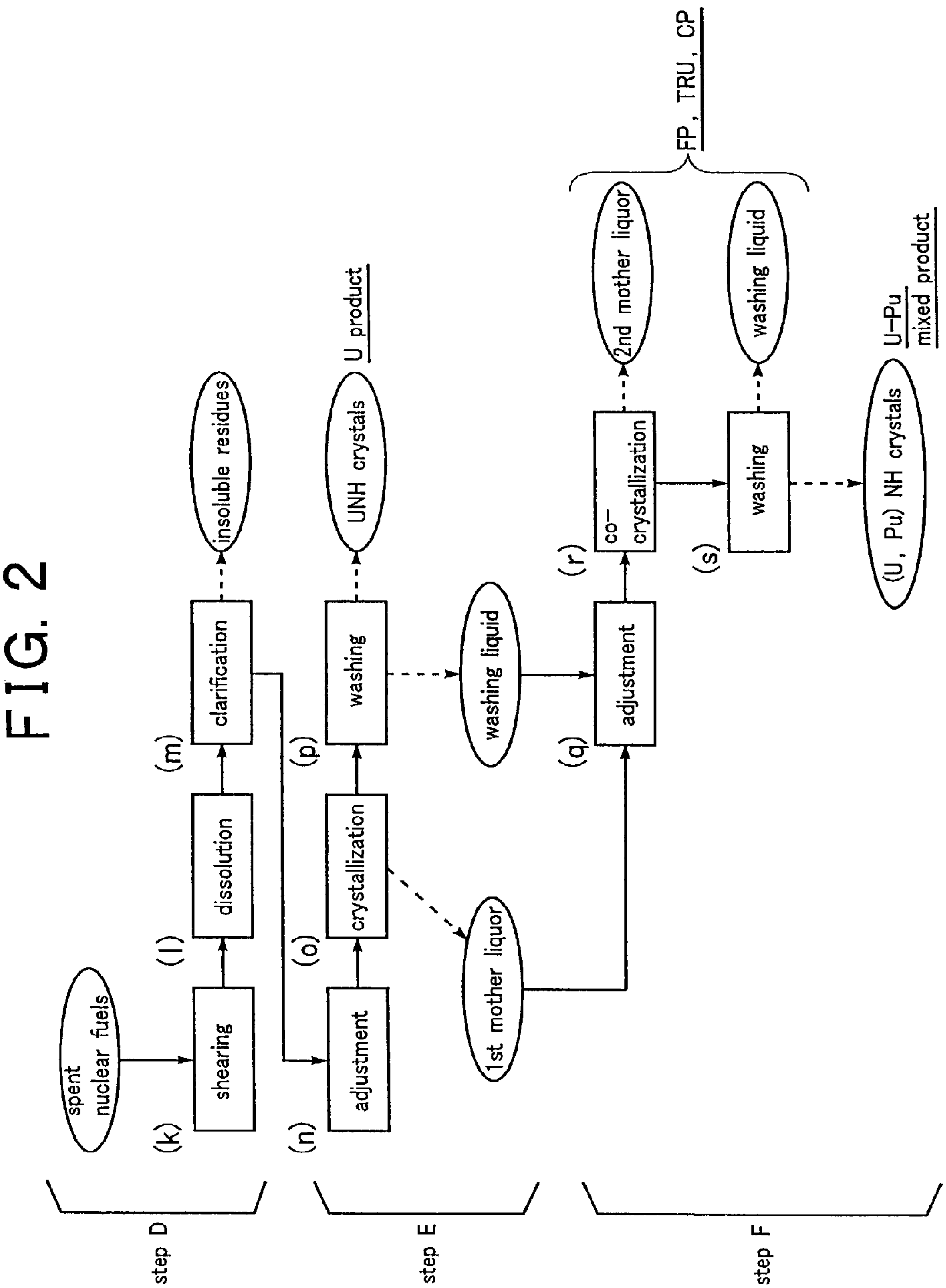
FIG. 2 is a flow chart showing another example of a process for reprocessing spent nuclear fuels according to this invention.

FIG. 2 is a flow chart showing another example of a process for reprocessing spent nuclear fuels by utilizing phenomenon of cocrystallization according to this invention.

At first, in the step D, spent nuclear fuels are sheared and dissolved into nitric acid to prepare a first nitric acid solution, and insoluble residues in the first solution are removed. The step D is identical with the step A in the example as shown in FIG. 1. Referring more specifically:

(k) The spent nuclear fuels (bundle of fuel pins) are sheared into small pieces by a shearing machine.

(l) Sheared pieces are dissolved in nitric acid to prepare the first nitric acid solution. For this purpose, boiling nitric acid at a concentration of 13 N or lower at about 110° C. is used, for instance.

(m) Then, the first solution after clarification is transferred to the next step. Thus, the insoluble residues in the first solution are removed.

Then, in the next step E, a nitric acid concentration of the first solution is adjusted and a valence of Pu in the first solution is adjusted to tetravalence. The first solution is then cooled to crystallize UNH crystals and separated into the resulting UNH crystals and a first mother liquor. The separated UNH crystals are washed and recovered as a U product. Referring more specifically:

(n) The nitric acid concentration of the first solution is adjusted to about 6 M and the valence of Pu in the first solution is adjusted from hexavalence to tetravalence. This valence adjustment is conducted by, for instance, blowing NOx gas into the first solution. The nitric acid concentration in the first solution is adjusted so as not to form water ($H_2O$) and crystals of nitric acid tri-hydrate ($HNO_3.3H_2O$) by cooling in the crystallization step (o).

(o) By cooling the first solution from about 40° C. to about 10° C., the UNH crystals are crystallized, and the UNH crystals are separated from the first solution to form the first mother liquor.

(p) The separated UNH crystals are washed with nitric acid at a nitric acid concentration substantially identical with that of the first mother liquor and the washed UNH crystals are recovered as the U product.

Further, in the step F, a nitric acid concentration in the first mother liquor is adjusted and a valence of U and Pu in the first mother liquor is adjusted to hexavalence. The first mother liqor is then cooled to crystallize (U,Pu)NH crystals and separated into the resulting (U,Pu)NH crystals and a second mother liquor. The separated (U,Pu)NH crystals are washed and recovered as a U—Pu mixed product. FP, TRU, CP and the like contained in the second mother liquor are separated and removed from the (U,Pu)NH crystals. Referring more specifically:

(q) The nitric acid concentration in the first mother liquor is adjusted and the valence of U and Pu in the first mother liquor is adjusted to hexavalence.

(r) By cooling the first mother liquor from about 40° C. to about −30° C., the (U,Pu)NH crystals are crystallized, and these crystals are separated from the first mother liquor to form the second mother liquor.

(s) The separated (U,Pu)NH crystals are washed with nitric acid at a nitric acid concentration substantially identical with that of the second mother liquor and recovered as the U—Pu mixed product.

In each of the examples described above, when nitric acid is recovered by distilling all or a portion of the mother liquors and washing liquids generated in the steps of crystallization and washing, the recovered nitric acid can be re-used for dissolution, nitric acid concentration adjustment or washing.

When the recovered amount of U is controlled by adjusting the crystallization temperature and time in the step (i) or (o), the U/Pu ratio in the finally recovered U—Pu mixed product can be controlled. This is because the solubility curve for U (U concentration relative to the solution temperature using the concentration of the nitric acid solution as a parameter) has already been known and, accordingly, the yield can be controlled on the basis of the solubility curve by adjusting the cooling temperature and the nitric acid concentration. For example, about 60% of U can be recovered with the U/Pu ratio being 3:1 by cooling the solution from about 40° C. to about 10° C., as in the examples described above.

As being apparent from the foregoing, since this invention is a process of recovering U and Pu from spent nuclear fuels by utilizing phenomenon of cocrystallization of U and Pu, the amount of the reagent and the solvent used in the process steps can be decreased as compared with the conventional Purex process and the amount of liquid wastes generated can be reduced. Further, since an organic solvent such as TBP or the like is not used, burnable “Red Oil” is not formed. Furthermore, since U and Pu are recovered simultaneously and Pu is not recovered separately, the resistance to nuclear proliferation can be strengthened.

What is claimed is:

1. A process for reprocessing spent nuclear fuels by utilizing phenomenon of cocrystallization comprising;

a step of shearing spent nuclear fuels, dissolving sheared spent nuclear fuels into nitric acid to prepare a first nitric acid solution and removing insoluble residues in the first solution, a step of adjusting a nitric acid concentration of the first solution and adjusting a valence of uranium and plutonium in the first solution into hexavalence, cooling the first solution to crystallize uranyl-plutonyl nitrate hydrate crystals and separating the first solution into a first mother liquor and the uranyl-plutonyl nitrate hydrate crystals, and a step of dissolving the separated uranyl-plutonyl nitrate hydrate crystals again into nitric acid to prepare a second nitric acid solution, adjusting a valence of plutonium in the second solution into tetravalence, cooling the second solution to crystallize uranyl nitrate hydrate crystals, separating the second solution into a second mother liquor and the uranyl nitrate hydrate crystals, recovering the separated uranyl nitrate hydrate crystals as a uranium product and recovering the separated second mother liquor as a uranium-plutonium mixed product.

2. A process for reprocessing spent nuclear fuels by utilizing phenomenon of cocrystallization comprising;

a step of shearing spent nuclear fuels, dissolving sheared spent nuclear fuels into nitric acid to prepare a first nitric acid solution and removing insoluble residues in the first solution, a step of adjusting a nitric acid concentration of the first solution and adjusting a valence of plutonium in the first solution into tetravalence, cooling the first solution to crystallize uranyl nitrate hydrate crystals, separating the first solution into a first mother liquor and the uranyl nitrate hydrate crystals and recovering the separated uranyl nitrate hydrate crystals as a uranium product, and a step of adjusting a nitric acid concentration of the separated first mother liquor and adjusting a valence of uranium and plutonium in the first mother liquor into hexavalence, cooling the first mother liquor to crystallize uranyl-plutonyl nitrate hydrate crystals, separating the first mother liquor into a second mother liquor and the uranyl-plutonyl nitrate hydrate crystals and recovering the separated uranyl-plutonyl nitrate hydrate crystals as a uranium-plutonium mixed product.

* * * * *